June 7, 1927.
G. P. LUCKEY
1,631,746
FLOWMETER
Filed Jan. 26, 1923
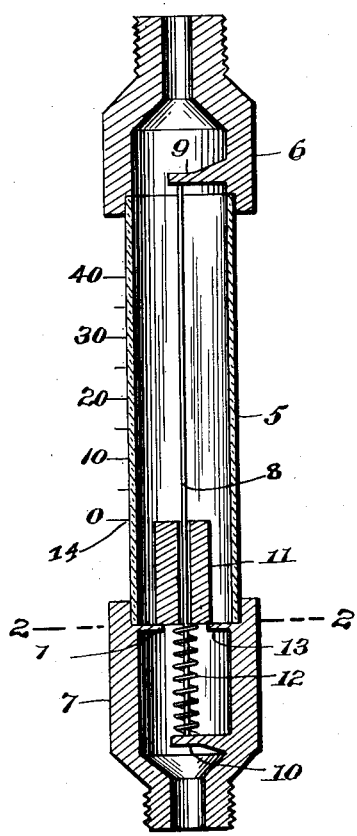
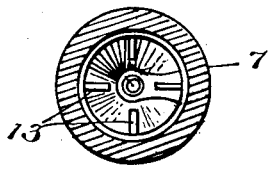
Inventor
George P. Luckey
By Robert H. Young
Attorney Patented June 7, 1927.

1,631,746

UNITED STATES PATENT OFFICE.

GEORGE P. LUCKEY, OF DAYTON, OHIO.

FLOW METER.

Application filed January 26, 1923. Serial No. 615,093.

This invention relates to flowmeters and has for its object to produce a flowmeter of simple construction, embodying a minimum number of working parts, and attaining the highest degree of reliability in practical use. A further object in view is to produce a flowmeter which will adapt itself to quantity production without sacrificing reliability and accuracy.

With the above and other objects in view, the invention consists in the novel construction, combination and arrangement herein fully described, illustrated and claimed.

In the accompanying drawings—

Figure 1 is a diametrical section through the improved flowmeter;

Figure 2 is a cross-section thereof taken on line 2—2 of Figure 1.

In the illustrated embodiment of the invention, I employ a tubular casing including a transparent cylindrical tube 5 of such material as glass or celluloid, at the extremities of which are headers 6 and 7 rabbeted to receive the tube 5, the latter being cemented or otherwise fastened therein. The headers are terminally reduced in diameter and threaded, as shown, to enable the casing to be coupled to any service pipe.

Extending longitudinally and centrally of the tube 5 is a guide 8, such as a rod or wire, attached fixedly at its extremities to supporting arms 9 and 10 within the headers 6 and 7.

Movable along the guide 8 is a body 11 the weight of which is equal to that of an equal volume of the liquid passing through the casing of the flowmeter. The body 11 is moved in the direction of flow of the liquid by the friction or drag of the liquid on said body. The body 11 is however restrained by a coiled spring 12, one end of which is attached to said body and the other end to the arm 10. The body 11 rests at the zero point against spider like stop projections 13 inside of the header 7.

As the body 11 is moved along the guide 8, it registers with graduations 14 on the tube 5 and thereby indicates the rate of flow of the liquid through the casing of the flowmeter.

The action of the body 11, and, therefore, the flowmeter, is controlled by the viscosity and friction of the liquid passing through the flowmeter. The amount of motion of the body 11 is the measure of rapidity of flow of the liquid. Due to the fact that the weight of the body 11 is the same as an equal volume of the liquid the flowmeter is free from the effects of gravity so that it will indicate equally well in all positions independent of the force of gravity.

What I claim is—

1. In a flowmeter for liquids, a graduated transparent tubular cylinder of uniform diameter, a body having the same specific gravity as that of the liquid passing through the cylinder and movable longitudinally of and within said cylinder by the friction of the liquid flowing therethrough, and a spring of progressively increasing force to resist such movement of said body.

2. In a flowmeter for liquids, a tubular casing of uniform diameter, a body movable longitudinally within said casing by the friction of the liquid flowing through the casing, said body being of the same weight as an equal volume of said liquid, and mechanical means for resisting such movement of the body with progressively increasing force.

3. In a flowmeter for liquids, a tubular casing of uniform diameter, a body movable longitudinally within said casing by the friction of the liquid flowing through the casing, said body being of the same weight as an equal volume of said liquid, a guide for said body extending axially of the casing, and mechanical means for resisting such movement of the body with progressively increasing force.

In testimony whereof I affix my signature.

GEORGE P. LUCKEY.